(12) United States Patent
Rosen

(10) Patent No.: US 6,824,069 B2
(45) Date of Patent: Nov. 30, 2004

(54) PROGRAMMABLE THERMOSTAT SYSTEM EMPLOYING A TOUCH SCREEN UNIT FOR INTUITIVE INTERACTIVE INTERFACE WITH A USER

(76) Inventor: Howard B. Rosen, 1 Lyncroft Road, Hampstead QC (CA), H3X 3E3

( * ) Notice: Subject to any disclaimer, the term of this patent is extended or adjusted under 35 U.S.C. 154(b) by 522 days.

(21) Appl. No.: 10/060,768

(22) Filed: Jan. 30, 2002

(65) Prior Publication Data

US 2003/0142121 A1 Jul. 31, 2003

(51) Int. Cl.⁷ .............................................. G05D 23/00
(52) U.S. Cl. ........................ 236/94; 236/1 C; 345/173; 345/702
(58) Field of Search .............................. 236/1 C, 91 R, 236/94; 345/173, 702, 810, 864; 62/126, 129

(56) References Cited

U.S. PATENT DOCUMENTS

| | | |
|---|---|---|
| 4,224,615 A | 9/1980 | Penz |
| 5,170,935 A | 12/1992 | Federspiel et al. |
| 5,818,428 A | 10/1998 | Eisenbrandt et al. |
| 6,285,912 B1 | 9/2001 | Ellison et al. |
| 6,344,861 B1 | 2/2002 | Naughton et al. |
| 6,581,846 B1 * | 6/2003 | Rosen ....................... 236/46 R |
| 6,595,430 B1 * | 7/2003 | Shah ......................... 236/46 R |
| 6,619,555 B2 * | 9/2003 | Rosen ....................... 236/46 R |

OTHER PUBLICATIONS

Honeywell Press Release, "Honeywell Unveils Visionpro Touch Screen Thermostats," May 11, 2004, 1 page.*

* cited by examiner

*Primary Examiner*—Marc Norman (57) ABSTRACT

A programmable thermostat system for controlling space conditioning equipment includes: a transparent touch pad juxtaposed over a liquid crystal display to constitute a touch screen for interactive interface with a user; a temperature sensor; and a processor including: a CPU; a real time clock; and a memory for storing program and data information. A program stored in the memory directs the CPU to: A) selectively establish, on the liquid crystal display, a menu including a representation of a button at a predetermined XY position; B) read the position on the touch pad juxtaposed with the first predetermined position to determine if the button has been touched; and C) if the button has been touched, change to a different menu or establish a condition incorporated into the thermostat system operation. Preferably, an alphanumeric message explaining the function of the button is also displayed. Different menus can place the buttons and messages in various positions on the touch screen to facilitate intuitive programming of the thermostat system.

18 Claims, 6 Drawing Sheets

PROGRAMMABLE THERMOSTAT SYSTEM EMPLOYING A TOUCH SCREEN UNIT FOR INTUITIVE INTERACTIVE INTERFACE WITH A USER

FIELD OF THE INVENTION

This invention relates to the art of thermostats and, more particularly, to a programmable thermostat system incorporating an integrated liquid crystal display/touch pad unit, constituting a touch screen, for interactive intuitive interface with a user to facilitate programming the thermostat system.

BACKGROUND OF THE INVENTION

Thermostats have been used for many years as a temperature sensitive switch which controls heating and/or cooling equipment for conditioning a space in which the thermostat, or a temperature sensor connected to the thermostat, is placed. In the well known manner, a simple thermostat can be adjusted to establish a temperature set point such that, when the temperature in the conditioned space reaches the set point, the thermostat interacts with the heating and/or cooling equipment to take suitable action to heat or cool the conditioned space as may be appropriate for the season.

Modern thermostat systems, which take advantage of the ongoing rapid advances in electronic technology and circuit integration, have many features which provide more precise supervision of the heating and/or cooling equipment to achieve more economical and more comfortable management of the temperature of a conditioned space. Many modem thermostat systems include a real time clock, a memory and a data processor to run a process control program stored in the memory to accurately measure the temperature of a temperature sensor disposed in the conditioned space and to send control signals to the heating and/or cooling equipment to closely control the temperature of the conditioned space. The use of programmed thermostat systems permit anticipating and minimizing hysterisis or overshoot of the temperature in the conditioned space. In addition, the program can specify different set points at different times of the day and week and may also include a "vacation" mode which employs different set points when the conditioned space is not occupied for an extended period.

Many modern thermostat systems are programmable by a user. Typically, prior art programmable thermostat system employ a tactile touch pad with various fixed positionbuttons to be touched in a precise sequence to program set points (which may vary with the day of the week) for programmable time periods which may include a vacation mode. The programming sequence may be followed on a separate display, typically a liquid crystal display.

There is a fundamental problem with the prior art programmable thermostat systems: they are difficult to program and some users are unable to successfully program them. This is because the user interfaces which have been employed in prior art programmable interfaces are not highly intuitive. Programmable thermostat systems have incorporated fixed position buttons, at least some of which have multi-functions depending upon the point at which a user has reached in the programming process. The user must usually refer to and attempt to decipher a programming manual (which is often difficult for the average user to readily understand) as the programming proceeds. But, the programming process is so complex to follow while trying to remember the instructions that many users give up, and the full capabilities of the thermostat system cannot be utilized.

The present invention addresses this problem fundamentally and solves the problem in an efficient and highly effective manner.

SUMMARY OF THE INVENTION

A programmable thermostat system for controlling space conditioning equipment according to the invention includes: a transparent touch pad juxtaposed over a liquid crystal display to constitute a touch screen for interactive interface with a user; a temperature sensor for providing an electrical signal indicative of the temperature of a conditioned space; and a processor including: a central processing unit; a real time clock; a memory coupled to the central processing unit for storing program and data information; and an input/output unit coupled between the processor and said touch screen for carrying out information transfer therebetween. A program stored in the memory directs the central processing unit to communicate through the input/output unit to selectively: establish on the liquid crystal display a representation of at least one button at a predetermined XY position; read the same XY position on the touch pad to determine if the "button" has been touched; and if the button has been touched, perform a predetermined action such as moving to a different menu or changing operating criteria. Preferably, an alphanumeric message explaining the function of the button is also displayed, and icon indicators may be employed to unmistakably associate a message with a button. Different menus can place the buttons and messages in various positions on the touch screen to facilitate intuitive programming.

DESCRIPTION OF THE DRAWING

The subject matter of the invention is particularly pointed out and distinctly claimed in the concluding portion of the specification. The invention, however, both as to organization and method of operation, may best be understood by reference to the following description taken in conjunction with the subjoined claims and the accompanying drawing of which:

DESCRIPTION OF THE PREFERRED EMBODIMENT(S)

Figure 1:
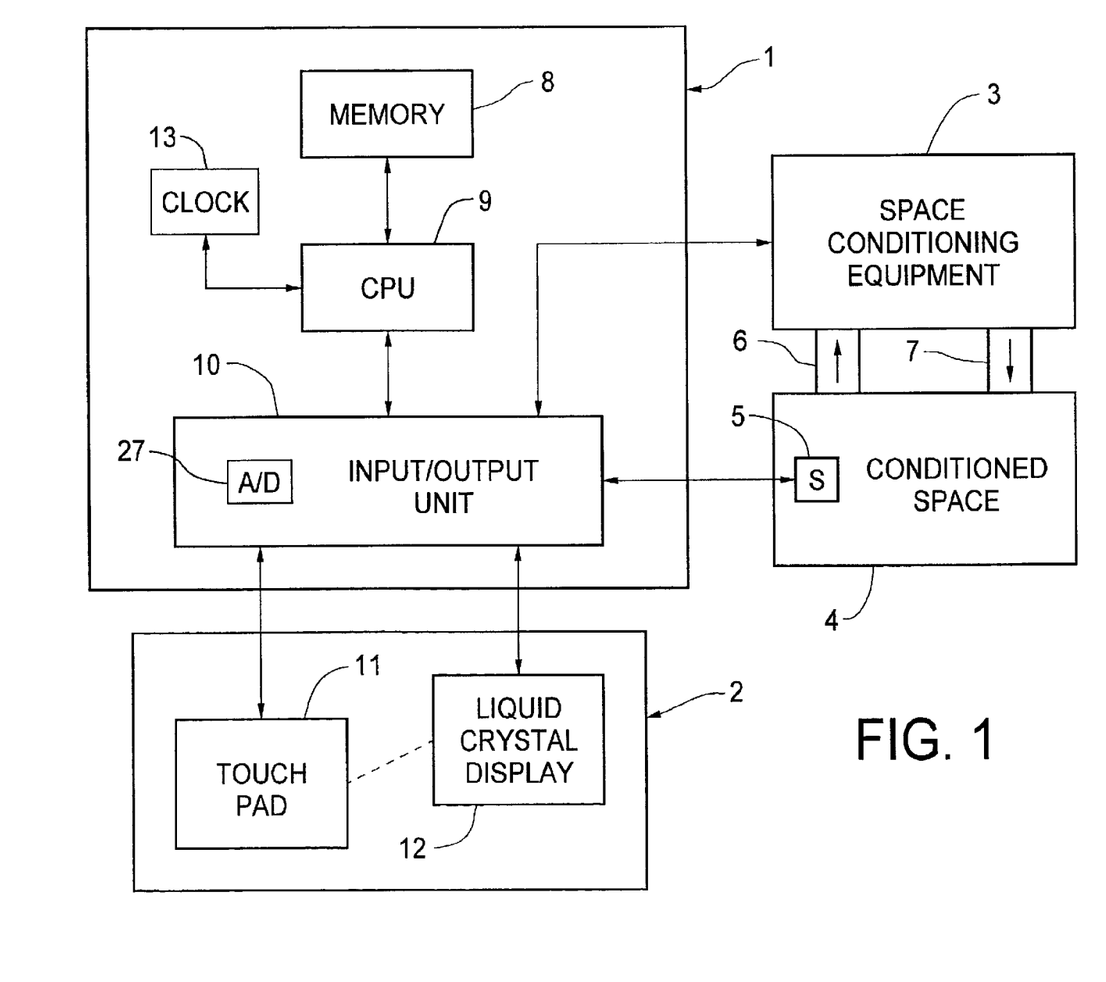
FIG. 1 is a block diagram of a space conditioning system incorporating a thermostat system employing the present invention.

Referring first to FIG. 1, a thermostat system includes a processor 1, a touch screen 2 and a temperature sensor 5 which is disposed in a conditioned space 4. It will be understood that the processor 1 and the touch screen 2 are typically situated in a common housing (not shown). The sensor 5 may also be situated in the common housing or remotely as shown, all as very well known in the art. The common housing is usually, but not necessarily, placed in the conditioned space 4. Thus, those skilled in the art will understand that the block diagram of FIG. 1 is very general in order to best explain the invention.

The processor 1 includes a central processing unit (CPU) 9 in communication with a memory 8 for storing data and program information and also, via an input/output unit (I/O unit) 10, a touch pad 11 and a liquid crystal display (LCD) 12 which constitute the touch screen 2. The memory 8 may include a read-only part which is factory-programmed and a random-access part which stores data subject to change during operation. A settable real time clock 13 is used to keep time in the thermostat system to facilitate diverse operations, such as different temperature set points (desired temperatures), during different periods of the day cycle. An analog-to-digital converter 27 (which may not be required in all systems) serves to convert any analog information received by the I/O unit 10 to digital information which is suitable for use by the CPU 9. The thermostat system may be suitably powered by a battery (not shown) and/or from equipment to which is connected.

Temperature information from the sensor 5 and output signals to a space conditioning (heating and/or cooling) unit 3 pass through the I/O unit 10 under control of the CPU 9. Those skilled in the art will understand that if the correspondents external to the processor 1 communicating with the CPU 9 are all digital in nature (e.g., if the temperature sensor 5 incorporates its own analog-to-digital converter and sends a digital representation of temperature to the processor 1), then the I/O unit 10 may only constitute simple switching circuits. The liquid crystal display may optionally be backlit by any suitable means (not shown).

Thus, in the usual manner during normal operation, the temperature sensor 5 sends an electrical signal (e.g., if the sensor 5 is a simple thermistor, a resistance value; several types of temperature sensors are widely used) representative of the temperature within the conditioned space 4 which the processor can compare against a previously entered set point to determine if control signals need to be sent to the space conditioning equipment 3. For example, if the temperature in the conditioned space 4 is found to be too low when operation is in the heating mode, the processor 1 signals the spaced conditioning equipment 3 circulate, through ducts 6, 7, air from/to the conditioned space 4 which is heated by the space conditioning equipment before return to the conditioned space. This heating phase continues until the sensor 5 indicates that the space is now too hot (or approaching too hot) with reference to the set point such that the processor 1 sends signal(s) to the space conditioning equipment 3 to cease the heating function, all as very well known in the art. In a cooling mode, a counterpart procedure is followed. Those skilled in the art will understand that the control process typically includes such refinements as anticipation, hysterisis accommodation, fan control, etc. which are acknowledged, but are not directly relevant to the invention.

It may be noted that integrated circuit chips including all the processor components with all the necessary interface conditioning circuits are available off-the-shelf and are under constant refinement for increased power. The subject invention only requires the capabilities of such a processor, and off-the-shelf integrated circuit processor chips may be used to advantage in the subject thermostat system.

Thermostat systems may be user programmable or non-user programmable. The present invention relates to programmable thermostat systems in which, in the prior art, programming steps have been entered using a "tactile" touch pad while observing a display which may be a liquid crystal display or some other display type. The drawbacks of the prior art interactive components have been discussed above. The present invention employs a different type of thermostat user interface; viz., the touch screen 2, in which the touch pad 11 and LCD 12 are integrated and coordinated as will be discussed below and which, in conjunction with the processor 1, provides a programmable thermostat system which is very much easier to program than in the prior art.

Figure 2:
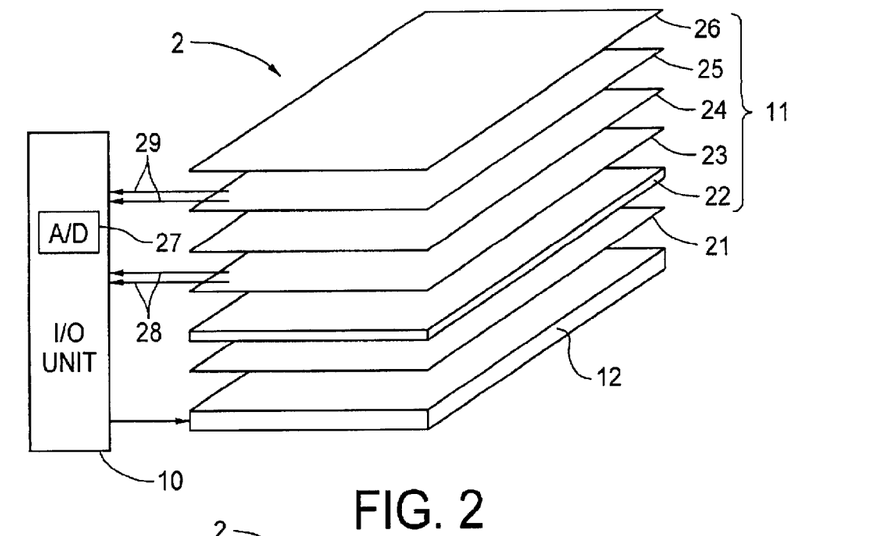
FIG. 2 is an exploded view of an exemplary touch screen which is a key component of the thermostat system.

Referring now to FIG. 2, there is shown an exploded view of an exemplary touch screen 2 according to the invention. The structure shown in FIG. 2 is exemplary only, and several other structures capable of performing the same functions will be discussed below.

A transparent touch pad 11, constituting generally planar layers 22-26, is juxtaposed over a flat panel LCD 12 with RF shield layer 21 interposed. The layers of the touch screen 11 (a relatively simple "four-wire" analog resistive type in the example) are respectively: a transparent glass substrate 22; a transparent film 23 for the X-plane; insulating spacer microspheres; a transparent film 25 for the Y-plane; and an transparent outer hard coating 26. In the example, the facing surfaces of the X-plane film 23 and the Y-plane film 25 are coated with indium tin oxide (ITO), and they are normally prevented from making electrical contact by the microspheres. Contact between the X-plane film 23 and the Y-plane film 25 is made by mechanical pressure from, for example, a finger touch. When contact occurs, the coordinates are determined from the resistance value that is proportional to the location of the touch. The X-plane resistance value is coupled to the I/O unit 10 by conductors 28, and the Y-plane resistance value is transferred by the conductors 29. In the I/O unit 10, the resistance values for the XY position of a touch are converted to digital values by the A/D converter 27 for use by the processor.

It should be understood that the touch pad 11 shown in FIG. 2 and described immediately above is only one of several types of transparent touch screens which can be juxtaposed with the LCD 12 to constitute the touch screen 2 (FIG. 1). The commercially available types of transparent touch pads contemplated for alternate use in the invention at the current state-of-the-art are: resistive analog (4-wire as shown, 5-wire and 8-wire); resistive matrix; capacitive matrix; acoustic surface wave; near field imaging; capacitive overlay; and infrared scanning. Future types of touch screens may be expected to be appropriate for use in this invention.

Figure 3:
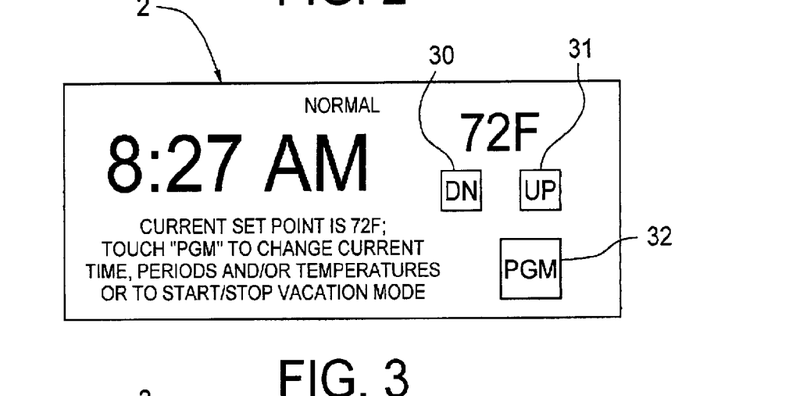
FIG. 3 is an exemplary pictorial of a high level interactive interface displayed on the touch screen during normal operation.

Consider now the advantages of employing the touch screen 2 in the subject thermostat system in conjunction with the following discussion of various exemplary displays which can be presented on the touch screen 2 and which invite interaction by a user. FIG. 3 shows the touch screen displaying normal operating information and also representations of buttons 30, 31 and 32. The "buttons" 30, 31, 32 are generated by the processor 1 at predetermined convenient and intuitive positions on the touch screen 2 which have been stored in the memory. If one of the buttons is touched, the XY information describing the touch point is sent to the processor which recognizes that the position at which the touch screen has been touched is juxtaposed with that particular button and responds by carrying out some predetermined associated action. For example, if the button 30, labeled "DN", is touched, that fact is sensed by the processor which drops the current set point from, say, 72° F. to 71° F. The set point can similarly be raised by touching the button 31 which is labeled "UP". Touching the touch screen 2 outside the button positions does not affect operation.

Attention is directed, in FIG. 3, to the alphanumeric message to the left of the button 32 labeled "PGM". A user is invited, if desired, to touch the "PGM" button 32 to change the current time, time periods and/or temperatures or to start/stop vacation mode. (These actions are exemplary only; for example, "select heat/cool mode" and other such actions can be included as appropriate for a particular thermostat system.) If the button 32 is touched, a menu such as that shown if FIG. 4 replaces (using display information prestored in memory 8) the display shown in FIG. 3.

Figure 4:
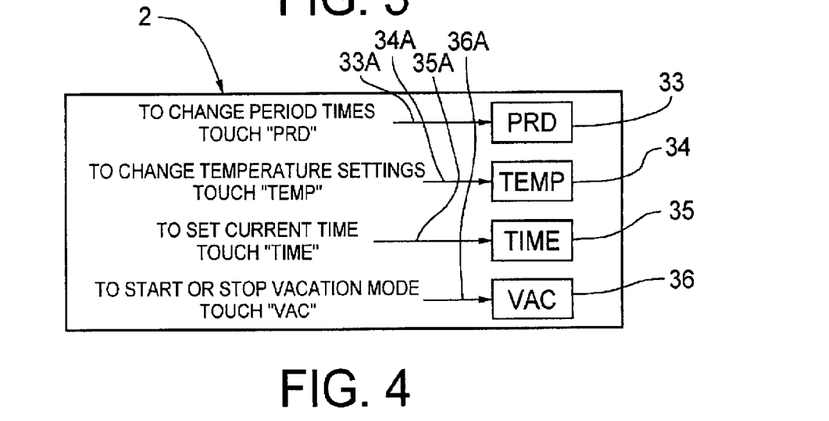
FIG. 4 is an exemplary pictorial of an intermediate level interactive interface displayed on the touch screen.

The intermediate level display of FIG. 4 invites a user to select one of the four available actions which are individually explained by the corresponding four alphanumeric messages. FIG. 4, with reference to FIG. 3, illustrates a particularly significant feature of the invention. The four choice buttons "PRD" 33, "TEMP" 34, "TIME" 35 and "VAC" 36, are vertically arrayed toward the right of the touch screen 2 at predetermined convenient positions from display information stored in the memory 8. But, if these positions are compared to the positions of the buttons 30, 31, 32 in FIG. 3, it will be seen that they would "interfere" physically if conventional tactile buttons were used. With the present invention, however, the positions of buttons on different menus can be placed wherever it is most intuitive and convenient for the present selection of operations. This is impossible to achieve with the prior art thermostat systems and is a prime factor in the ease of programming enjoyed by the use of the subject thermostat system.

FIG. 4 also shows another, optional, feature of the invention. Because each menu can be displayed in any manner a system programmer wishes, icon indicators, such as the arrows 33A, 34A, 35A, 36A, can be included to further assist a user to select and touch the correct button to successfully move to the next menu or make other selections with confidence.

Figure 5:
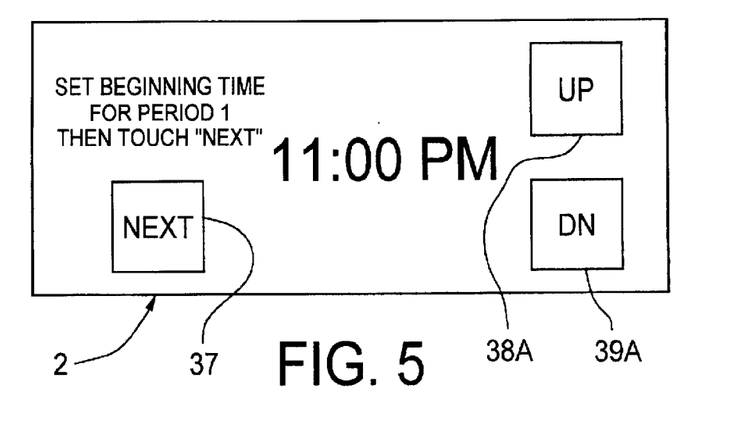
FIG. 5 is an exemplary pictorial of a low level interactive interface displayed on the touch screen.
Figure 6:
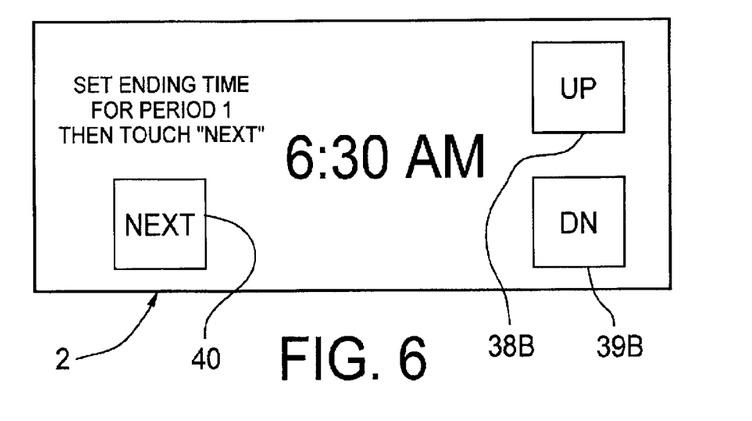
FIG. 6 is an exemplary pictorial of another low level interactive interface displayed on the touch screen.
Figure 7:
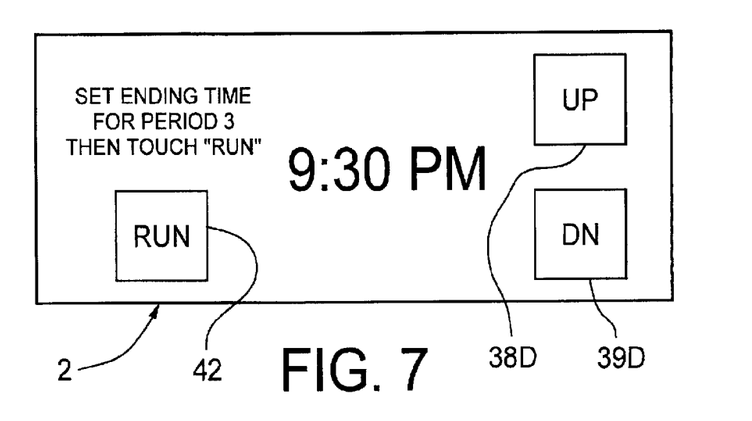
FIG. 7 is an exemplary pictorial of another low level interactive interface displayed on the touch screen.

Accordingly, if a user wishes, from the menu shown in FIG. 4, to change the period times, he is unmistakably directed to touch the "PRD" button 33. In response, the processor 1 causes a lower level menu such as that shown in FIG. 5 to be displayed to begin setting the discrete periods during which different temperature set points may be established. Assuming in the example that four periods are available, a user may set the beginning of "Period 1" to any time of day by using the "UP" button 38A and/or the "DN" button 39A until, say, 11:00 PM is shown in the prominent time display to the left of the buttons 38A, 39A. The user is prompted to, by the alphanumeric message above the "NEXT" button 37, to touch the "NEXT" button 37 after the beginning time for "Period 1" has been established. Touching the NEXT button 37 causes the processor to present the slightly different display shown in FIG. 6 from which the ending time for "Period 1" may be set. This step, in the example, also establishes the beginning time for "Period 2". After setting the ending time for "Period 1" by selectively touching the "UP" button 38B and/or the "DN" button 39B until, say, 6:30 AM is reached, the user touches the "NEXT" button 40 to bring up an almost identical display (not shown) for setting the ending time for "PERIOD 2" to, say, 4:30 PM which also sets the beginning time for "Period 3" and then proceeds to the screen shown in FIG. 7. From the menu shown in FIG. 7, the user sets, using buttons 38D, 39D, the ending time, say 9:30 PM, for "Period 3" which also establishes the beginning time for "Period 4". (The ending time for "Period 4" is the same as the already entered beginning time for "Period 1".) After this information as been entered, the user is directed to touch "RUN" button 42 which returns the thermostat system to normal operation and again brings up the menu shown in FIG. 3.

Figure 8:
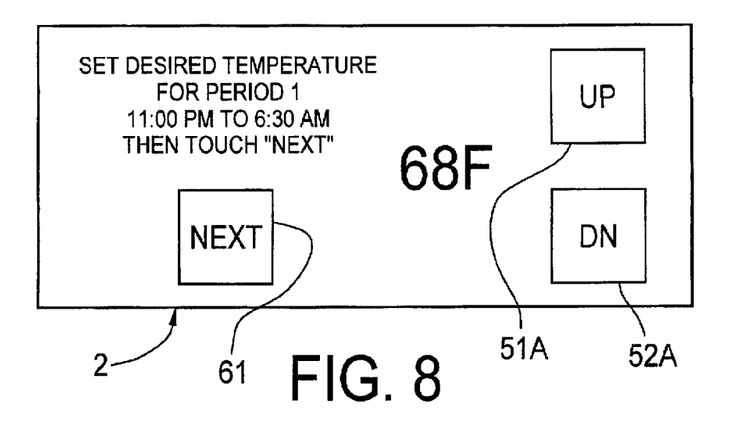
FIG. 8 is an exemplary pictorial of another low level interactive interface displayed on the touch screen.
Figure 9:
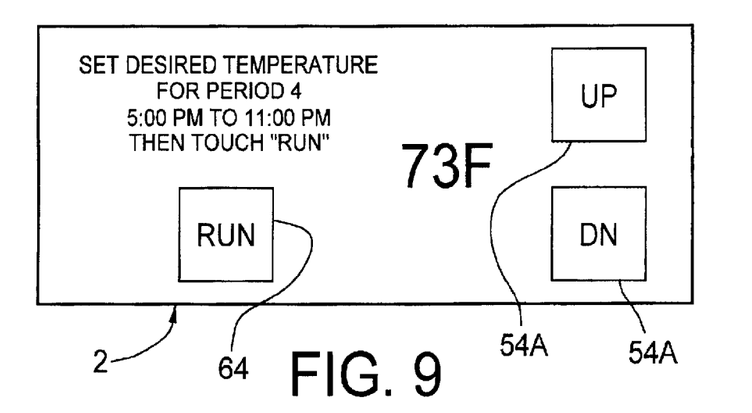
FIG. 9 is an exemplary a pictorial of another low level interactive interface displayed on the touch screen.

If a user wishes to change the temperature set point in any of the exemplary four periods, the "PGM" button 32 is touched to move to the menu of FIG. 4 and the "TEMP" button 34 is touched as urged by the relevant alphanumeric message and, if provided, the icon indicator arrow 34A. The menu shown in FIG. 8 appears in response and in which the current set point for "Period 1", 68° F. in the example, is prominently shown. The user touches the "UP" button 51A and/or the "Down" button 52A as necessary to set a new set point for this period and then touches the "NEXT" button 61 as invited by the alphanumeric message presented above that button. Almost identical (only the alphanumeric message being suitably revised) menus (not shown) successively appear for making the corresponding adjustments to the set points for "Period 2" and "Period 3" after which the menu shown in FIG. 9 appears. After the set point is adjusted for "Period 4" by touching the buttons 54A, 54B as necessary, the user is invited to touch the "RUN" button 64 which will again return the system to normal operation with the menu shown in FIG. 3 presented.

Figure 10:
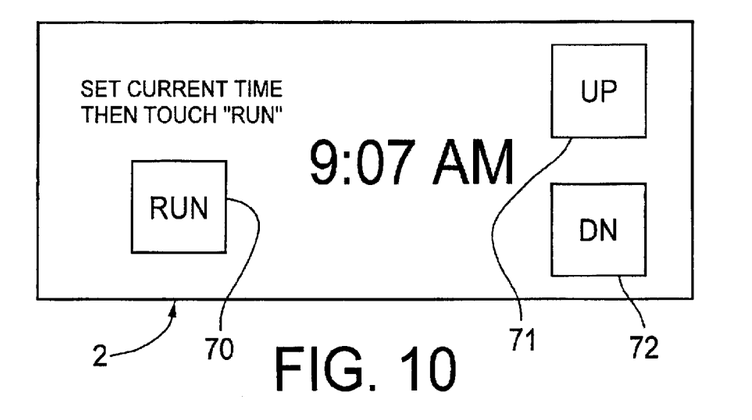
FIG. 10 is an exemplary pictorial of another low level interactive interface displayed on the touch screen.

If a user wishes to set the present time, the "PGM" button 32 is touched (FIG. 3) and the "TIME" button 35 (FIG. 4) is touched which causes the processor 1 to establish the menu shown in FIG. 10 on the touch screen 2. The prominently displayed current time is adjusted by suitably touching the "UP" button 71 and/or the "DN" button 72 until the correct current time is displayed. The user is then invited, by the alphanumeric message shown, to touch the "RUN" button 70 to return to normal operation with the display of FIG. 3 which will now show the correct current time.

Figure 11:
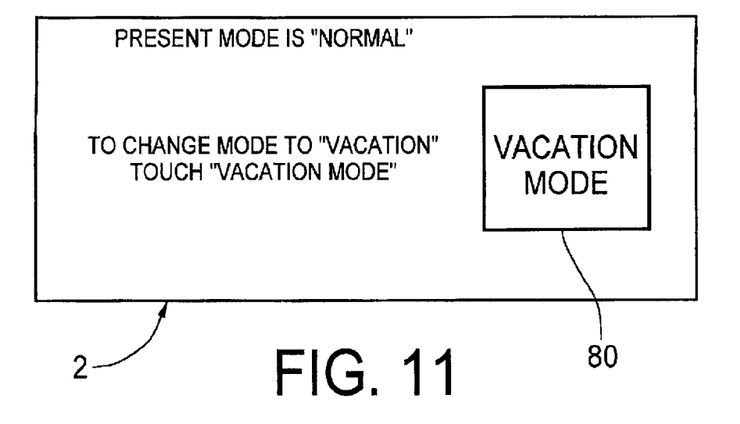
FIG. 11 is an exemplary pictorial of another high level interactive interface displayed on the touch screen.

Some programmable thermostat systems incorporate a vacation mode in which different temperature set points for the several periods are desirable in order to economize on the energy costs associated with conditioning the temporarily unoccupied space 4. From the successive menus shown in FIGS. 3 and 4, the "PGM" button 32 and the "VAC" button 36 are touched to direct the processor to establish the menu shown in FIG. 11 in which the user is invited to touch the "VACATION MODE" button 80. This action directs the processor 1 to display the menu shown in FIG. 12 in which a message invites the user to touch the "PGM" button 32V in order to set up the vacation mode set point temperatures for the several periods. This procedure is performed as discussed above, but the processor 1 is aware that vacation mode temperature set points are being entered and does not change the normal mode set points. After the vacation mode set points have been set (the last from the menu shown in FIG. 9) the menu shown in FIG. 12 is displayed during the vacation period.

Figure 12:
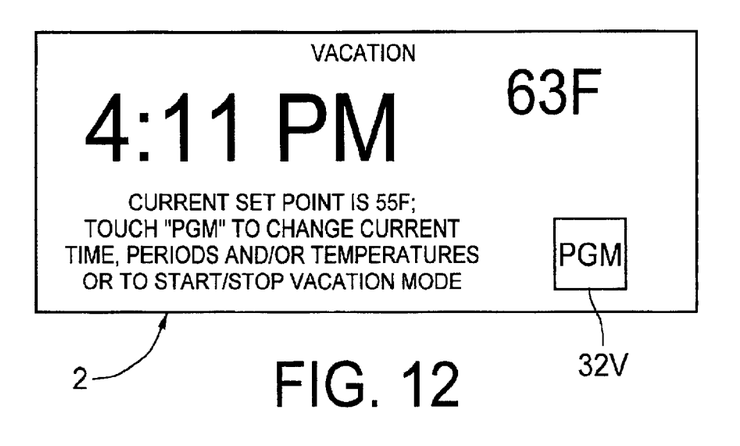
FIG. 12 is an exemplary pictorial of another low level interactive interface displayed on the touch screen.
Figure 13:
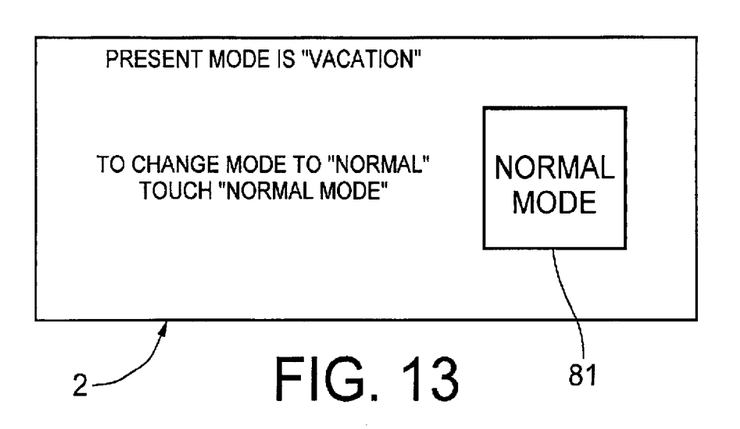
FIG. 13 is an exemplary pictorial of another high level interactive interface displayed on the touch screen.

Still referring to FIG. 12, when the space 2 is again to be occupied, a user can successively touch the "PGM" button 32V and the "VAC" button 35 (FIG. 4) from which the processor 1 will establish the menu shown in FIG. 13 on the touch screen 2. The user is invited to touch the "NORMAL MODE" button 81 by the alphanumeric message, and the processor 1 will respond by restoring normal operation, with the correct previously established normal temperature set points, and return to the menu shown in FIG. 3.

Figure 14:
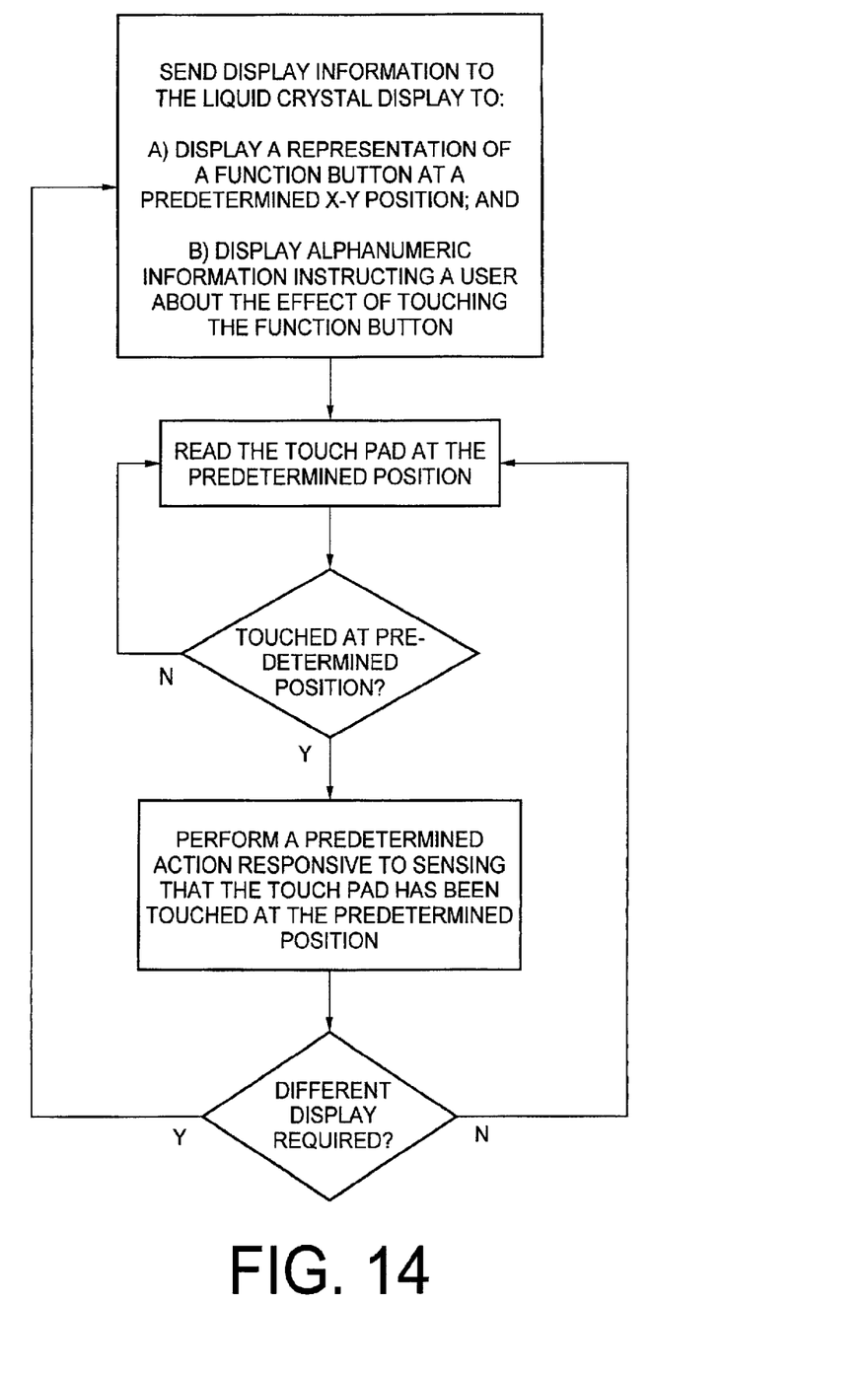
FIG. 14 is a high level process flow chart alternatively describing a principal feature of the operation of the invention.

FIG. 14 is a process flow chart alternatively presenting fundamental aspects of the invention. By the use of a touch screen constituting a transparent touch pad juxtaposed over a liquid crystal display in a programmable thermostat system, programming is greatly simplified by the fact that various menus can have ergonomically variously placed "buttons" along with intuitively variously placed messages associated with each button.

It is important to note again that the exemplary displays/menus discussed above are merely to clearly present the invention. Commercial embodiments of the invention may incorporate more fully designed and elegant refinements in various configurations in a plurality of models.

Thus, while the principles of the invention have now been made clear in an illustrative embodiment, there will be immediately obvious to those skilled in the art many modifications of structure, arrangements, proportions, the elements, materials, and components, used in the practice of the invention which are particularly adapted for specific environments and operating requirements without departing from those principles.

What is claimed is:

1. A programmable thermostat system for controlling space conditioning equipment comprising:
   A) a temperature sensor for providing an electrical signal indicative of the temperature of a conditioned space in which the temperature sensor is situated;
   B) a transparent touch pad juxtaposed over a liquid crystal display to constitute a touch screen for interactive interface with a user;
   C) a processor, said processor including:
      1) a central processing unit;
      2) a real time clock;
      3) a memory coupled to said central processing unit for storing program and data information; and
      4) an input/output unit coupled between said processor and said touch screen for carrying out information transfer therebetween, said input/output unit further including:
         a) a sensor input coupled to said temperature sensor for receiving said electrical signal therefrom; and
         b) a control output coupled to the space conditioning equipment for issuing control signals thereto; and
   D) a program stored in said memory for causing said central processing unit to communicate through said input/output unit to selectively:
      1)a) establish on said liquid crystal display a representation of at least one button at a first predetermined position on the liquid crystal display;
      1)b) read the position on the touch pad juxtaposed with said first predetermined position on the liquid crystal display to determine if the representation of said at least one button has been touched; and
      1)c) if said at least one representation of a button has been touched, making a predetermined response thereto; and
      2)a) periodically read said electrical signal from said temperature sensor;
      2)b) in response to the value of the electrical signal read in step D)2)a) determining if at least one control signal to the space conditioning equipment is required in order to maintain the temperature in the conditioned space within a predetermined range; and
      2)c) if it determined in step D)2)b) that said at least one signal is required, issuing said at least one control signal.

2. The thermostat system of claim 1 in which said transparent touch pad is selected from within the classes of touch screens including: resistive matrix, resistive analog, capacitance, scanning infrared, surface wave and near field imaging.

3. The thermostat system of claim 2 in which said central processor selectively generates, from information stored in said memory, an alphanumeric message for display on said liquid crystal display to convey system information to a user.

4. The thermostat system of claim 3 in which said central processor selectively generates, from information stored in said memory, an alphanumeric message, for display on said liquid crystal display, setting forth a result which will be achieved is said at least one representation of a button is touched.

5. The thermostat system of claim 4 in which said central processor selectively generates, from information stored in said memory, a linking indicator extending from proximate said alphanumeric message to proximate said at least one representation of a button to signify their relationship.

6. The thermostat system of claim 1 in which said central processor selectively generates, from information stored in said memory, an alphanumeric message for display on said liquid crystal display to convey system information to a user.

7. The thermostat system of claim 6 in which said central processor selectively generates, from information stored in said memory, an alphanumeric message, for display on said liquid crystal display, setting forth a result which will be achieved is said at least one representation of a button is touched.

8. The thermostat system of claim 7 in which said central processor selectively generates, from information stored in said memory, a linking indicator extending from proximate said alphanumeric message to said at least one representation of a button to signify their relationship.

9. A programmable thermostat system for controlling space conditioning equipment comprising:
   A) a temperature sensor for providing an electrical signal indicative of the temperature of a conditioned space in which the temperature sensor is situated;
   B) a transparent touch pad juxtaposed over a liquid crystal display to constitute a touch screen for interactive interface with a user;
   C) a processor, said processor including:
      1) a central processing unit;
      2) a real time clock;
      3) a memory coupled to said central processing unit for storing program and data information; and
      4) an input/output unit coupled between said processor and said touch screen for carrying out information transfer therebetween, said input/output unit further including:
         a) a sensor input coupled to said temperature sensor for receiving said electrical signal therefrom; and
         b) a control output coupled to the space conditioning equipment for issuing control signals thereto; and
   D) a program stored in said memory for causing said central processing unit to communicate through said input/output unit to selectively:

1) establish on said liquid crystal display a representation of at least one button at a first predetermined position on the liquid crystal display;
2) read the position on the touch pad juxtaposed with said first predetermined position on said liquid crystal display to determine if the representation of said at least one button has been touched;
3) if said at least one representation of a button has been touched, displaying a plurality of distributed representations of buttons on said liquid crystal display, each button representing a corresponding choice of thermostat system settings which can be selected by touching said touch pad at the selected representation;
4) read the positions on the touch screen juxtaposed with each of said distributed representations of buttons to determine if at least one representation of a button displayed in step D)3) has been touched; and
5) is said at least one representation of a button displayed in step D)4) has been touched, processing this information to establish a condition incorporated into the operation of said thermostat system.

10. The thermostat system of claim 9 in which said touch pad is selected from within the classes of touch screens including: resistive matrix, resistive analog, capacitance, scanning infrared, surface wave and near field imaging.

11. The thermostat system of claim 10 in which said central processor selectively generates, from information stored in said memory, an alphanumeric message for display on said liquid crystal display to convey system information to a user.

12. The thermostat system of claim 11 in which said central processor selectively generates, from information stored in said memory, an alphanumeric message, for display on said liquid crystal display, setting forth a result which will be achieved is said at least one representation of a button is touched.

13. The thermostat system of claim 12 in which said central processor selectively generates, from information stored in said memory, a linking indicator extending from proximate said alphanumeric message to proximate said at least one representation of a button to signify their relationship.

14. The thermostat system of claim 9 in which said central processor selectively generates, from information stored in said memory, an alphanumeric message for display on said liquid crystal display to convey system information to a user.

15. The thermostat system of claim 14 in which said central processor selectively generates, from information stored in said memory, an alphanumeric message, for display on said liquid crystal display, setting forth a result which will be achieved is said at least one representation of a button is touched.

16. The thermostat system of claim 15 in which said central processor selectively generates, from information stored in said memory, a linking indicator extending from proximate said alphanumeric message to proximate said at least one representation of a button to signify their relationship.

17. A programmable thermostat system for controlling space conditioning equipment comprising:
A) a temperature sensor for providing an electrical signal indicative of the temperature of a conditioned space in which the temperature sensor is situated;
B) a transparent touch pad juxtaposed over a liquid crystal display to constitute a touch screen for interactive interface with a user;
C) a processor, said processor including:
   1) a central processing unit;
   2) a real time clock; and
   3) a memory coupled to said central processing unit for storing program and data information; and
D) a program stored in said memory for causing said central processing unit to selectively:
   1) establish on said liquid crystal display a first menu which includes a first representation of a button at a first predetermined position;
   2) read the position on the touch pad juxtaposed with said first predetermined position to determine if said first representation of a button has been touched;
   3) if said first representation of a button has been touched, displaying a second menu which includes a second representation of a button at a second predetermined position;
   4) read the position on the touch pad juxtaposed with said second predetermined position to determine if said second representation of a button has been touched; and
   5) if said second representation of a button has been touched, processing this information to establish a condition incorporated into the operation of said thermostat system.

18. The thermostat system of claim 17 in which:
A) during step D)3), said second menu further includes a third representation of a button at a third predetermined position;
B) during step D)4), the position on the touch pad juxtaposed with said third predetermined position is read to determine if said third representation of a button has been touched; and
C) during step D)5), if said third representation of a button has been touched, processing this information to establish a second condition incorporated into the operation of said thermostat system.

* * * * *

Disclaimer and Dedication

6,824,069 B2—Howard B. Rosen, Hampstead QC (CA). PROGRAMMABLE THERMOSTAT SYSTEM EMPLOYING A TOUCH SCREEN UNIT FOR INTUITIVE INTERACTIVE INTERFACE WITH A USER. Patent dated Nov. 30, 2004. Disclaimer and Dedication filed Feb. 28, 2005, by the inventor, Howard B. Rosen.

Hereby disclaims and dedicates to the Public, all claims of said patent.

*(Official Gazette, October 25, 2005)*